US007162619B2

(12) United States Patent
Henry et al.

(10) Patent No.: US 7,162,619 B2
(45) Date of Patent: Jan. 9, 2007

(54) APPARATUS AND METHOD FOR DENSELY PACKING A BRANCH INSTRUCTION PREDICTED BY A BRANCH TARGET ADDRESS CACHE AND ASSOCIATED TARGET INSTRUCTIONS INTO A BYTE-WIDE INSTRUCTION BUFFER

(75) Inventors: G. Glenn Henry, Austin, TX (US); Thomas C. McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 491 days.

(21) Appl. No.: 09/898,583

(22) Filed: Jul. 3, 2001

(65) Prior Publication Data

US 2005/0198481 A1    Sep. 8, 2005

(51) Int. Cl.
    *G06F 9/38*    (2006.01)
    *G06F 9/00*    (2006.01)
(52) U.S. Cl. ........................... 712/237; 712/240
(58) Field of Classification Search ........ 712/237–240, 712/235
    See application file for complete search history.

(56) References Cited

U.S. PATENT DOCUMENTS

| | | | |
|---|---|---|---|
| 3,980,991 A | 9/1976 | Mercurio | |
| 4,181,942 A | 1/1980 | Forster et al. | |
| 4,200,927 A | 4/1980 | Hughes et al. | |
| 4,860,197 A | 8/1989 | Langendorf et al. | |
| 5,142,634 A | 8/1992 | Fite et al. | |
| 5,163,140 A | 11/1992 | Stiles et al. | |
| 5,313,634 A | 5/1994 | Eickemeyer | |
| 5,353,421 A * | 10/1994 | Emma et al. ............... | 712/240 |
| 5,355,459 A | 10/1994 | Matsuo et al. | |
| 5,394,530 A | 2/1995 | Kitta | |
| 5,404,467 A | 4/1995 | Saba et al. | |
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A | 2/1997 | Hoyt et al. | |
| 5,623,614 A | 4/1997 | Van Dyke et al. | |
| 5,623,615 A | 4/1997 | Salem et al. | |

(Continued)

OTHER PUBLICATIONS

The Authoritative Dictionary of IEEE Standards Terms; Standards Information Network, IEEE Press; 7th Edition, 2000; p. 135.*

(Continued)

*Primary Examiner*—Fritz Fleming
*Assistant Examiner*—Jesse Moll
(74) *Attorney, Agent, or Firm*—E. Alan Davis; James W. Huffman (57) ABSTRACT

A branch control apparatus in a microprocessor. A register receives a first cache line containing a branch instruction from an instruction cache in response to a fetch address. The fetch address hits in a BTAC that provides a target address of the branch instruction. The BTAC also provides an offset of the instruction following the branch instruction. The instructions following the branch instruction are invalidated based on the offset. Muxing logic packs only the valid instructions into a byte-wide instruction buffer that is directly coupled to instruction format logic. The instruction cache provides a second cache line containing the target instructions to the register in response to the target address. The instructions preceding the target instructions are invalidated based on the lower bits of the target address. The muxing logic packs only the valid target instructions into the instruction buffer immediately adjacent to the branch instruction bytes.

52 Claims, 5 Drawing Sheets

Microprocessor with Branch Control Apparatus 100

U.S. PATENT DOCUMENTS

| Patent | Date | Inventor |
|---|---|---|
| 5,634,103 A | 5/1997 | Dietz et al. |
| 5,687,349 A | 11/1997 | McGarity |
| 5,687,360 A | 11/1997 | Chang |
| 5,706,491 A | 1/1998 | McMahan |
| 5,721,855 A | 2/1998 | Hinton et al. |
| 5,734,881 A | 3/1998 | White et al. |
| 5,752,069 A | 5/1998 | Roberts et al. |
| 5,761,723 A | 6/1998 | Black et al. |
| 5,768,576 A | 6/1998 | Hoyt et al. |
| 5,805,877 A * | 9/1998 | Black et al. ............ 712/239 |
| 5,812,839 A | 9/1998 | Hoyt et al. |
| 5,828,901 A | 10/1998 | O'Toole et al. |
| 5,832,289 A | 11/1998 | Shaw et al. |
| 5,850,532 A | 12/1998 | Narayan et al. |
| 5,850,543 A * | 12/1998 | Shiell et al. ............ 712/238 |
| 5,864,707 A | 1/1999 | Tran et al. |
| 5,867,701 A | 2/1999 | Brown et al. |
| 5,881,260 A | 3/1999 | Raje et al. |
| 5,881,265 A | 3/1999 | McFarland et al. |
| 5,931,944 A | 8/1999 | Ginosar et al. |
| 5,948,100 A * | 9/1999 | Hsu et al. ............ 712/238 |
| 5,961,629 A | 10/1999 | Nguyen et al. |
| 5,964,868 A | 10/1999 | Gochman et al. |
| 5,968,169 A | 10/1999 | Pickett |
| 5,974,543 A | 10/1999 | Hilgendorf et al. |
| 5,978,909 A | 11/1999 | Lempel |
| 6,035,391 A * | 3/2000 | Isaman ............ 712/222 |
| 6,041,405 A | 3/2000 | Green |
| 6,044,459 A | 3/2000 | Bae et al. |
| 6,081,884 A * | 6/2000 | Miller ............ 712/204 |
| 6,085,311 A | 7/2000 | Narayan et al. |
| 6,088,793 A | 7/2000 | Liu et al. |
| 6,101,595 A | 8/2000 | Pickett et al. |
| 6,108,773 A | 8/2000 | Col et al. |
| 6,122,729 A | 9/2000 | Tran |
| 6,134,654 A | 10/2000 | Patel et al. |
| 6,151,671 A | 11/2000 | D'Sa et al. |
| 6,157,988 A | 12/2000 | Dowling |
| 6,170,054 B1 | 1/2001 | Poplingher |
| 6,175,897 B1 | 1/2001 | Ryan et al. |
| 6,185,676 B1 | 2/2001 | Poplingher et al. |
| 6,233,676 B1 | 5/2001 | Henry et al. |
| 6,250,821 B1 * | 6/2001 | Schwendinger ............ 712/238 |
| 6,256,727 B1 | 7/2001 | McDonald |
| 6,260,138 B1 | 7/2001 | Harris |
| 6,279,105 B1 | 8/2001 | Konigsburg et al. |
| 6,279,106 B1 | 8/2001 | Roberts |
| 6,308,259 B1 | 10/2001 | Witt |
| 6,314,514 B1 | 11/2001 | McDonald |
| 6,321,321 B1 | 11/2001 | Johnson |
| 6,351,796 B1 | 2/2002 | McCormick et al. |
| 6,374,350 B1 | 4/2002 | D'Sa et al. |
| 6,457,120 B1 | 9/2002 | Sinharoy |
| 6,502,185 B1 | 12/2002 | Keller et al. |
| 6,560,696 B1 | 5/2003 | Hummel et al. |
| 6,601,161 B1 | 7/2003 | Rappoport et al. |
| 6,647,467 B1 | 11/2003 | Dowling |
| 6,725,357 B1 | 4/2004 | Cousin |
| 6,748,441 B1 | 6/2004 | Gemmell |
| 6,754,808 B1 | 6/2004 | Roth et al. |
| 6,823,444 B1 | 11/2004 | Henry et al. |
| 6,886,093 B1 | 4/2005 | Henry |
| 6,895,498 B1 | 5/2005 | McDonald et al. |
| 6,898,699 B1 | 5/2005 | Jourdan et al. |
| 6,968,444 B1 | 11/2005 | Kroesche et al. |
| 2002/0188833 A1 | 12/2002 | Henry et al. |
| 2002/0194460 A1 | 12/2002 | Henry et al. |
| 2002/0194461 A1 | 12/2002 | Henry et al. |
| 2002/0194464 A1 | 12/2002 | Henry et al. |
| 2004/0030866 A1 | 2/2004 | McDonald |
| 2004/0139281 A1 | 7/2004 | McDonald |
| 2004/0139292 A1 | 7/2004 | McDonald |
| 2004/0139301 A1 | 7/2004 | McDonald |
| 2004/0143709 A1 | 7/2004 | McDonald |
| 2004/0143727 A1 | 7/2004 | McDonald |
| 2005/0044343 A1 | 2/2005 | Henry et al. |
| 2005/0076193 A1 | 4/2005 | Henry et al. |
| 2005/0114636 A1 | 5/2005 | McDonald et al. |
| 2005/0132175 A1 | 6/2005 | Henry et al. |
| 2005/0198479 A1 | 9/2005 | Bean et al. |

OTHER PUBLICATIONS

Online Computing Dictionary, http://instantweb.com/d/dictionary/foldoc.cgi?query=btb, May 5, 1995, Branch Target Buffer.*
Microprocessor Report, vol. 9, No. 2, Feb. 16, 1995, p. 5.
Microprocessor Report, Aug. 23, 1999, p. 7.
IEEE 100, The Authoritative Dictionary of IEEE Standard Terms, Seventh Edition, The Institute of Electrical Engineering, Inc., 3 Park Avenue, New York, NY, 10016-5997, Copyright 2000, Published by Standards Information Network IEEE Press, Published Dec. 2000, USA, p. 135.
Yeh et al. *Alternative Implementation of Two-Level Adaptive Branch Prediction.* 19th Annual International Symposium on Computer Architecture. pp. 124-134. May 19-21, 1992. Gold Coast, Australia.
Chang et al. *Alternative Implementations of Hybrid Branch Predictors.* Proceedings of MICRO-28. 1995. IEEE.
Mc Farling, Scott. *WRL Technical Note TN-36.* Combining Branch Predictors. Jun. 1993. Western Research Laboratory, 250 University Ave., Palo Alto, CA 94301.
Bray et al. *Strategies For Branch Target Buffers.* Technical Report No. CSL-TR-91-480. Jun. 1991.
Sakamoto et al. *Microarchitecture Support for Reducing Branch Penalty in a Superscaler Processor.* pp. 208-216. Mittsubishi Electric Corp. 4-1 Mizuhara, Itami, Hyogo 664. Japan, 1996, IEEE.
The D Latch, Play-Hookey Web Page, Oct. 10, 1999.
Patterson et al. "Computer Organization & Design: The Hardware/Software Interface." Morgan Kaufmann Publishers, Inc. San Francisco, CA. 1996 p. 469.
Jimenez et al. "The Impact of Delay on the Design of Branch Predictors" 2000.
Eberly et al. "The Correlation Branch Target Address Cache" May 1996.
Patterson et al. "Computer Organization & Design: The Hardware/Software Interface." Morgan Kaufmann Publishers, Inc. San Francisco, CA 1998 p. 453-455.
IBM Technical Disclosure Bulletin NN9204269, "Return Address Stack Cache." Apr. 1992, pp. 269-271.

* cited by examiner

FIG. 4

Instruction Byte Selection Method

APPARATUS AND METHOD FOR DENSELY PACKING A BRANCH INSTRUCTION PREDICTED BY A BRANCH TARGET ADDRESS CACHE AND ASSOCIATED TARGET INSTRUCTIONS INTO A BYTE-WIDE INSTRUCTION BUFFER

CROSS-REFERENCE TO RELATED APPLICATIONS

This application is related to U.S. patent application Ser. No. 09/898,832 entitled APPARATUS AND METHOD FOR SELECTIVELY ACCESSING DISPARATE INSTRUCTION BUFFER STAGES BASED ON BRANCH TARGET ADDRESS CACHE HIT AND INSTRUCTION STAGE WRAP (now U.S. Pat. No. 6,823,444) having a common filing date and a common assignee, which is hereby incorporated by reference in its entirety for all purposes.

FIELD OF THE INVENTION

This invention relates in general to the field of branch target address caching in pipelined microprocessors, and more particularly to providing a correct instruction stream to an instruction buffer during a microprocessor branch caused by a branch target address cache hit.

BACKGROUND OF THE INVENTION

Pipelined microprocessors include multiple pipeline stages, each stage performing a different function necessary in the execution of program instructions. Typical pipeline stage functions are instruction fetch, instruction decode, instruction execution, memory access, and result write-back.

The instruction fetch stage fetches the next instruction in the currently executing program. The next instruction is typically the instruction with the next sequential memory address. However, in the case of a taken branch instruction, the next instruction is the instruction at the memory address specified by the branch instruction, commonly referred to as the branch target address. The instruction fetch stage fetches instructions from an instruction cache. If the instructions are not present in the instruction cache, they are fetched into the instruction cache from another memory higher up in the memory hierarchy of the machine, such as from a higher-level cache or from system memory. The fetched instructions are provided to the instruction decode stage.

The instruction decode stage includes instruction decode logic that decodes the instruction bytes received from the instruction fetch stage. In the case of a processor that supports variable length instructions, such as an x86 architecture processor, one function of the instruction decode stage is to format a stream of instruction bytes into separate instructions. Formatting a stream of instructions includes determining the length of each instruction. That is, instruction format logic receives a stream of undifferentiated instruction bytes from the instruction fetch stage and formats, or parses, the stream of instruction bytes into individual groups of bytes. Each group of bytes is an instruction, and the instructions make up the program being executed by the processor. The instruction decode stage may also include translating macro-instructions, such as x86 instructions, into micro-instructions that are executable by the remainder of the pipeline.

The execution stage includes execution logic that executes the formatted and decoded instructions received from the instruction decode stage. The execution logic operates on data retrieved from a register set of the processor and/or from memory. The write-back stage stores the results produced by the execution logic into the processor register set.

An important aspect of pipelined processor performance is keeping each stage of the processor busy performing the function it was designed to perform. In particular, if the instruction fetch stage does not provide instruction bytes when the instruction decode stage is ready to decode the next instruction, then processor performance will suffer. In order to prevent starvation of the instruction decode stage, an instruction buffer is commonly placed between the instruction cache and instruction format logic. The instruction fetch stage attempts to keep several instructions worth of instruction bytes in the instruction buffer so that the instruction decode stage will have instruction bytes to decode, rather than starving.

Typically, an instruction cache provides a cache line of instruction bytes, typically 16 or 32 bytes, at a time. The instruction fetch stage fetches one or more cache lines of instruction bytes from the instruction cache and stores the cache lines into the instruction buffer. When the instruction decode stage is ready to decode an instruction, it accesses the instruction bytes in the instruction buffer, rather than having to wait on the instruction cache.

The instruction cache provides a cache line of instruction bytes selected by a fetch address supplied to the instruction cache by the instruction fetch stage. During normal program operation, the fetch address is simply incremented by the size of a cache line since it is anticipated that program instructions are executed sequentially. The incremented fetch address is referred to as the next sequential fetch address. However, if a branch instruction is decoded by the instruction decode logic and the branch instruction is taken (or predicted taken), then the fetch address is updated to the target address of the branch instruction (modulo the cache line size), rather than being updated to the next sequential fetch address.

However, by the time the fetch address is updated to the branch target address, the instruction buffer has likely been populated with instruction bytes of the next sequential instructions after the branch instruction. Because a branch has occurred, the instructions after the branch instruction must not be decoded and executed. That is, proper program execution requires the instructions at the branch target address to be executed, not the next sequential instructions after the branch instruction. The instruction bytes in the instruction buffer were erroneously pre-fetched in anticipation of the more typical case of sequential instruction flow in the program. To remedy this error, the processor must flush all instruction bytes behind the branch instruction, which includes the instruction bytes in the instruction buffer.

Flushing the instruction buffer upon a taken branch instruction is costly since now the instruction decode stage will be starved until the instruction buffer is re-populated from the instruction cache. One solution to this problem is to branch prior to decoding the branch instruction. This may be accomplished by employing a branch target address cache (BTAC) that caches fetch addresses of instruction cache lines containing previously executed branch instructions and their associated target addresses.

The instruction cache fetch address is applied to the BTAC essentially in parallel with the application of the fetch address to the instruction cache. In the case of an instruction cache fetch address of a cache line containing a branch instruction, the cache line is provided to the instruction buffer. In addition, if the fetch address hits in the BTAC, the BTAC provides an associated branch target address. If the branch instruction hitting in the BTAC is predicted taken, the instruction cache fetch address is updated to the target address provided by the BTAC.

Because the instruction cache provides a cache line of instructions at a time to the instruction buffer, there may be instruction bytes in the cache line after the branch instruction. The instruction bytes after the branch instruction should not be executed. Rather, the instruction bytes in the instruction buffer after the branch instruction must be discarded from the instruction byte stream provided to the instruction decode stage. However, the instruction buffer cannot be flushed wholesale (as was done with processors without the BTAC described above) since there may be valid instructions still present in the instruction buffer that have not yet been decoded. In particular, the branch instruction itself (and any other instruction bytes in the cache line prior to the branch instruction) need to be decoded and executed.

However, while the branch instruction remains in the instruction buffer and has not yet been formatted, the location of the instructions following the branch instruction in the instruction buffer are not known. This is because the branch instruction's length and location in the cache line are not known until it is formatted; and consequently, the location of the branch instruction in the instruction buffer is not known. Accordingly, the location of the instruction following the branch instruction is also not known.

Finally, the instruction decode stage in a variable instruction length processor includes separate portions that format associated portions of the instructions. For example, one portion of the format logic may format the opcode byte of the instruction, typically the first byte, whereas another portion of the format logic may format another portion of the instruction. The correct portion of the instruction byte stream must be provided to the correct portion of the instruction format logic.

Typically, it is a difficult task in the design of a pipelined microprocessor to design instruction format logic capable of performing instruction format functions within the cycle time of the processor. Hence, it is advantageous to provide as much of the cycle time for formatting instruction bytes as possible, rather than spending a portion of the time steering the instruction bytes to the appropriate portion of the format logic. Consequently, it is advantageous to employ an instruction buffer that is directly coupled to the instruction format logic in the instruction decode stage. That is, it is advantageous to eliminate logic required to steer the instruction bytes from the instruction buffer to the appropriate portion of the instruction format logic.

Therefore, what is needed is a branch control apparatus in a pipelined processor that enables use of an instruction cache fetch address-based BTAC in conjunction with an instruction buffer that is directly coupled to the processor's instruction format logic in order to increase the amount of processor cycle time available for instruction formatting.

SUMMARY

The present invention provides a branch control apparatus in a pipelined processor that enables use of a BTAC that caches instruction cache fetch addresses in conjunction with an instruction buffer that is directly coupled to the processor's instruction format logic. Accordingly, in attainment of the aforementioned object, it is a feature of the present invention to provide a branch control apparatus in a microprocessor. The apparatus includes an instruction cache that outputs a line of instruction bytes selected by a fetch address. The apparatus also includes an instruction buffer, coupled to the instruction cache, that buffers the line of instruction bytes. The apparatus also includes a branch target address cache (BTAC), coupled to the fetch address, which provides offset information relating to a location of a branch instruction within the line of instruction bytes. The apparatus also includes selection logic, coupled to the BTAC, which causes a portion of the instruction bytes to not be provided to the instruction buffer, based on the offset information.

In another aspect, it is a feature of the present invention to provide a pre-decode stage within a microprocessor. The pre-decode stage includes an instruction buffer that buffers instruction data for provision to instruction format logic. The pre-decode stage also includes selection logic, coupled to the instruction buffer, which receives first instruction data selected by a fetch address from an instruction cache. The first instruction data includes a branch instruction. The pre-decode stage also includes a branch target address cache (BTAC), coupled to the selection logic, which provides a target address of the branch instruction as a next fetch address to the instruction cache. The selection logic receives second instruction data selected by the target address from the instruction cache. The second instruction data includes a target instruction of the branch instruction. The selection logic writes the branch instruction and the target instruction immediately adjacent to one another in the instruction buffer.

In another aspect, it is a feature of the present invention to provide a method for providing a branch instruction and a target instruction of the branch instruction to an instruction buffer. The method includes receiving from the instruction cache a first cache line containing the branch instruction, and receiving from a branch target address cache (BTAC) an offset within the first cache line of an instruction immediately following the branch instruction. The method also includes receiving from the instruction cache a second cache line containing the target instruction. The second cache line is selected by a target address of the branch instruction provided by the BTAC. The method also includes discarding instructions after the branch instruction in the first cache line, and discarding instructions preceding the target instruction in the second cache line. The method also includes providing to the instruction buffer a portion of the first and second cache lines remaining after each of the discardings.

An advantage of the present invention is that it enables the use of a byte-wide instruction buffer that may be directly coupled to instruction format logic in conjunction with a pre-instruction buffer BTAC. That is, no muxing is required between the instruction buffer and format logic to provide the correct instruction byte to the correct format portion. Although byte-wide instruction buffers tend to be smaller than non-byte-wide instruction buffers, the direct coupling of them to the instruction format logic substantially reduces the timing constraints upon the format logic. The timing constraints are reduced by recovering additional time in the processor clock cycle for formatting instructions rather than having to spend time steering the instruction bytes from the instruction buffer to the appropriate portion of the instruction format logic. The direct coupling is possible because the present invention places only valid instruction bytes into the instruction buffer. The invention discards the instructions made invalid due to the branch before they are provided to the instruction buffer.

Other features and advantages of the present invention will become apparent upon study of the remaining portions of the specification and drawings.

DETAILED DESCRIPTION

Figure 1:
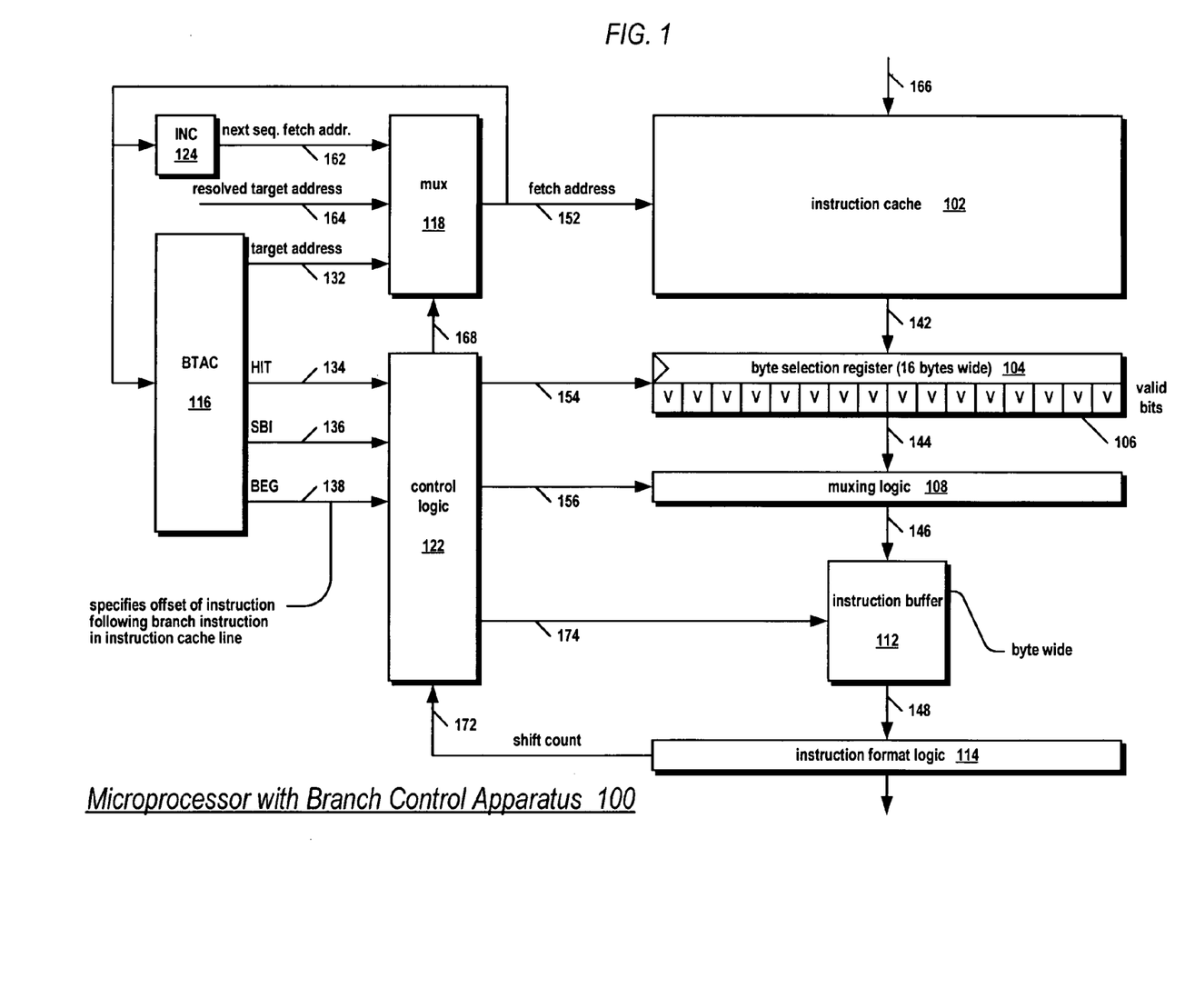
FIG. 1 is a block diagram of a pipelined microprocessor including a branch control apparatus according to the present invention.

Referring now to FIG. 1, a block diagram of portions of a pipelined microprocessor 100 including a branch control apparatus according to the present invention is shown. In one embodiment, the microprocessor 100 comprises an x86 architecture processor. In one embodiment, the microprocessor 100 comprises a 13-stage pipeline, comprising an instruction fetch stage, multiple instruction cache access stages, an instruction format stage, an instruction decode or translation stage, a register access stage, an address calculation stage, multiple data cache access stages, multiple execution stages, a store stage, and a write-back stage.

The microprocessor 100 includes an instruction cache 102 that caches instruction bytes. The instruction bytes are received from a memory via a data bus 166. The instruction cache 102 comprises an array of cache lines for storing instruction bytes. The array of cache lines is indexed by a fetch address 152. That is, the fetch address 152 selects one of the cache lines in the array. The instruction cache 102 outputs the selected cache line of instruction bytes via a data bus 142.

In one embodiment, the instruction cache 102 comprises a 64 KB 4-way set associative cache, with 32-byte cache lines per way. In one embodiment, one half of the selected cache line of instruction bytes is provided by the instruction cache 102 at a time, i.e., 16 bytes are provided during two separate periods each. In one embodiment, the instruction cache 102 is similar to an instruction cache described in U.S. patent application Ser. No. 09/849736 entitled SPECULATIVE BRANCH TARGET ADDRESS CACHE, having a common assignee, and which is hereby incorporated by reference in its entirety for all purposes.

The microprocessor 100 also includes a branch target address cache (BTAC) 116. The BTAC 116 also receives the instruction cache 102 fetch address 152. The BTAC 116 caches fetch addresses of previously executed branch instructions. The BTAC 116 comprises an array of storage elements for storing the target address of the branch instruction after the branch instruction is executed by the processor 100. The storage elements also store other speculative branch information related to the branch instructions for which the target addresses are cached. In particular, the storage elements store the location of the instruction following the branch instruction within the cache line. The fetch address 152 indexes the array of storage elements in the BTAC 116 to select one of the storage elements.

The BTAC 116 outputs a target address 132 and speculative branch information (SBI) 136 from the storage element selected by the fetch address 152. In one embodiment, the SBI 136 includes the branch instruction length, whether the branch instruction wraps over multiple instruction cache lines, whether the branch is a call or return instruction, and information used to predict the direction of the branch instruction, as described in U.S. Patent application entitled SPECULATIVE BRANCH TARGET ADDRESS CACHE which is incorporated by reference above.

The BTAC 116 also outputs a BEG value 138, which specifies the byte offset of the instruction following the associated branch instruction within the instruction cache line 142 selected by the fetch address 152. The BEG value 138 is cached in the BTAC 116 along with the branch instruction target address after execution of the branch instruction. The BEG value 138 is calculated by adding the instruction pointer of the branch instruction to the length of the branch instruction. If the microprocessor 100 branches to the target address 132 provided by the BTAC 116, then all the instructions in the cache line after the branch instruction are invalid. That is, the instruction bytes after the branch instruction should not be executed because the branch instruction has been taken. Hence, for proper program execution, the instruction bytes following the branch instruction must be discarded before execution.

The BTAC 116 also outputs a HIT signal 134 that indicates whether or not the fetch address 152 hit in the BTAC 116. In one embodiment, the BTAC 116 is similar to a BTAC described in U.S. Patent application entitled SPECULATIVE BRANCH TARGET ADDRESS CACHE which is incorporated by reference above. In particular, the BTAC 116 is a speculative BTAC because the microprocessor 100 branches to the target address 132 provided by the BTAC 116 before the instruction cache line provided by the instruction cache 102 is decoded to know whether or not a branch instruction is even present in the cache line selected by the fetch address. That is, the microprocessor 100 speculatively branches even though the possibility exists that no branch instruction is present in the cache line selected by the fetch address hitting in the BTAC 116.

The microprocessor 100 also includes control logic 122. The HIT signal 134, the SBI 136 and the BEG value 138 are all provided as inputs to the control logic 122. The operation of the control logic 122 is described in more detail below.

The microprocessor 100 also includes a mux 118. The mux 118 receives at least three addresses as inputs and selects one of the inputs as the fetch address 152 to the instruction cache 102 in response to control signal 168 from the control logic 122. The mux 118 receives the target address 132 from the BTAC 116. The mux 118 also receives a next sequential fetch address 162, which is the previous fetch address incremented by the size of an instruction cache 102 cache line by an incrementer 124 that receives the fetch address 152 and provides the next sequential fetch address 162 to the mux 118.

The mux 118 also receives a resolved target address 164. The resolved target address 164 is provided by execution logic in the microprocessor 100. The execution logic calculates the resolved target address 164 based on a full decode of a branch instruction. If after branching to the target address 132 provided by the BTAC 116, the microprocessor 100 later determines that the branch was erroneous, the microprocessor 100 corrects the error by flushing the pipeline and branching to either the resolved target address 164 or to the fetch address of a cache line including the instruction following the branch instruction. In one embodiment, the microprocessor 100 corrects the error by flushing the pipeline and branching to the fetch address of a cache line including the branch instruction itself, if the microprocessor 100 determines that no branch instruction was present in the cache line 142 as presumed. The error correction is as described in U.S. patent application Ser. No. 09/849658 entitled APPARATUS, SYSTEM AND METHOD FOR DETECTING AND CORRECTING ERRONEOUS SPECULATIVE BRANCH TARGET ADDRESS CACHE BRANCHES, having a common assignee, and which is hereby incorporated by reference in its entirety for all purposes.

In one embodiment, the mux 118 also receives other target addresses predicted by other branch prediction elements, such as a call/return stack and a branch target buffer (BTB) that caches target addresses of indirect branch instructions based on the branch instruction pointer. The mux 118 selectively overrides the target address 132 provided by the BTAC 116 with the target address provided by the call/return stack or BTB as described in U.S. patent application Ser. No. 09/849799 entitled SPECULATIVE BRANCH TARGET ADDRESS CACHE WITH SELECTIVE OVERRIDE BY SECONDARY PREDICTOR BASED ON BRANCH INSTRUCTION TYPE, having a common assignee, and which is hereby incorporated by reference in its entirety for all purposes.

The microprocessor 100 also includes a byte selection register 104 that receives from the instruction cache 102 the selected line of instruction bytes via data bus 142. In one embodiment, the byte selection register 104 is 16 bytes wide for receiving 16 instruction bytes from the instruction cache 102 at a time.

The microprocessor 100 also includes 16 valid bits 106 corresponding to each of the 16 bytes in the byte selection register 104. The valid bits 106 indicate whether or not a corresponding one of the bytes in the byte selection register 104 is a valid instruction byte for buffering, formatting, decoding, and executing by the microprocessor 100. The control logic 122 selectively sets or clears the valid bits 106 via control signals 154 based upon the HIT 134, SBI 136, and BEG 138 signals received from the BTAC 116. Instruction bytes after a taken branch instruction in the byte selection register 104 are marked invalid by the control logic 122. In addition, instruction bytes before the target instruction of a branch instruction are marked invalid. In one embodiment, the valid bits 106 are comprised within the control logic 122.

The microprocessor 100 also includes muxing logic 108 that receives the byte selection register 104 bytes via a data bus 144. The muxing logic 108 discards invalid bytes received from the byte selection register 104. The muxing logic 108 and its operation are described in more detail with respect to FIGS. 3 and 4 below.

The microprocessor 100 also includes an instruction buffer 112 that receives valid instruction bytes from the muxing logic 108 via a data bus 146. Advantageously, the muxing logic 108, based on control signals 156 from the control logic 122, selectively provides only valid ones of the bytes from the byte selection register 104 to the instruction buffer 112. Instruction bytes in the byte selection register 104 whose corresponding valid bit 106 indicates the byte is invalid are discarded by the muxing logic 108 and are not provided to the instruction buffer 112.

In one embodiment, the instruction buffer 112 stores thirteen instruction bytes. The instruction buffer 112 comprises a byte-wide shift register for storing instruction bytes. Advantageously, the instruction buffer 112 shifts out already formatted instruction bytes on a byte granularity basis, thereby leaving the first byte of a next instruction to be formatted at the bottom of the instruction buffer 112, as will be described in more detail below.

The microprocessor 100 also includes instruction format logic 114 that receives instruction bytes from the instruction buffer 112 via a data bus 148. The instruction format logic 114 examines the contents of the instruction buffer 112 and formats, or parses, the instruction bytes contained therein into separate instructions. In particular, the instruction format logic 114 determines the size in bytes of the instruction at the bottom of the instruction buffer 112. The instruction format logic 114 provides the formatted instructions to the remainder of the microprocessor 100 pipeline for further decode and execution. Advantageously, the instruction buffer 112 buffers instruction bytes in order to reduce the probability of starvation of the instruction format logic 114.

The instruction format logic 114 provides the size of the instruction at the bottom of the instruction buffer 112 to the control logic 122 via control signal 172. The control logic 122 uses the instruction size 172 to control the shifting of an instruction worth of instruction bytes out of the instruction buffer 112 via control signal 174. That is, control signal 172 serves as a shift count for the muxing logic 108 and instruction buffer 112. The control logic 122 also uses the shift count 172 to control the loading of instruction bytes into the instruction buffer 112. The control logic 122 also uses the shift count 172 to control the operation of the muxing logic 108 via control signal 156. In one embodiment, the instruction format logic 114 is capable of formatting multiple instructions per processor 100 clock cycle.

Figure 2:
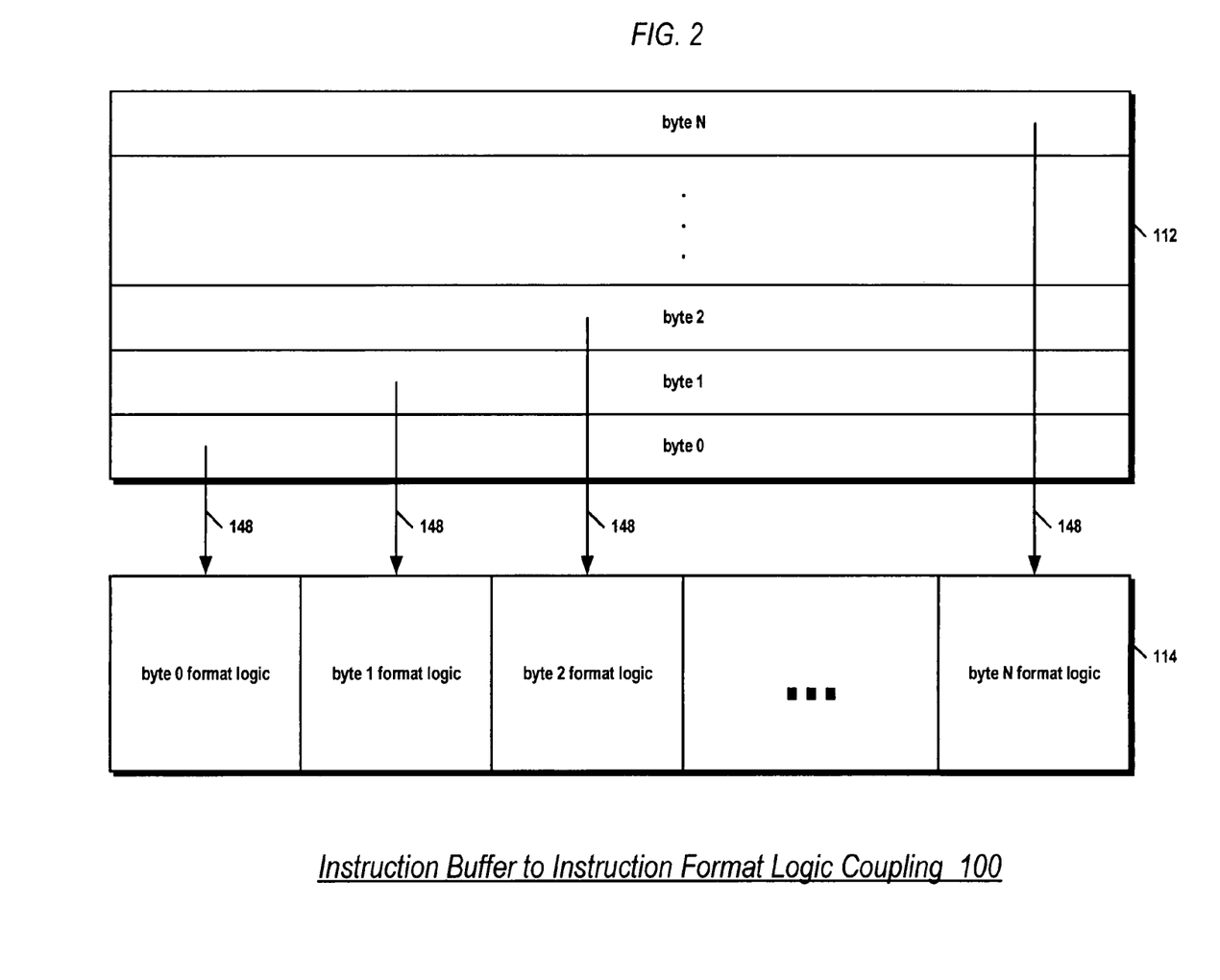
FIG. 2 is a block diagram illustrating the coupling of the instruction buffer and instruction format logic of FIG. 1 according to the present invention.

Referring now to FIG. 2, a block diagram illustrating the coupling of the instruction buffer 112 and instruction format logic 114 of FIG. 1 according to the present invention is shown. The instruction format logic 114 comprises separate portions for formatting various ones of the instruction bytes of an instruction of the microprocessor 100. In the embodiment shown in FIG. 2, the instruction format logic 114 comprises a portion for formatting byte 0, a portion for formatting byte 1, a portion for formatting byte 2, and so forth through a portion for formatting byte N. Correspondingly, the instruction buffer 112 comprises bytes 0, 1, 2 through N.

The portion of the instruction format logic 114 for formatting byte 0 of the instruction is configured to read byte 0 from the instruction buffer 112 directly via a portion of data bus 148 of FIG. 1. Similarly, the portion of the instruction format logic 114 for formatting byte 1 is configured to read byte 1 from the instruction buffer 112 directly via a second portion of data bus 148. The portion of the instruction format logic 114 for formatting byte 2 is configured to read byte 2 from the instruction buffer 112 directly via a third portion of data bus 148 and so forth through byte N.

Thus, it may be observed from FIG. 2 that the present invention advantageously provides a direct coupling between the instruction buffer 112 and the instruction format logic 114 such that no steering logic is needed in between for steering instruction bytes, thereby potentially providing improved timing characteristics of the microprocessor 100. This advantage is obtained in part because the byte-wide instruction buffer 112 shifts out an entire instruction at a time, such that the bottom byte in the instruction buffer 112 is always byte 0 of the next instruction to be formatted by the instruction format logic 114.

Advantageously, it is therefore not necessary to provide steering logic in between the instruction buffer 112 and instruction format logic 114 to steer the instruction bytes to the correct portion of the instruction format logic 114.

Typically, such steering logic is detrimental to timing, and may therefore lengthen the clock cycle of the microprocessor 100. However, with the benefit of the present invention, the clock cycle of the microprocessor 100 may potentially be shortened when employing a BTAC 116 of the type described herein.

Figure 3:
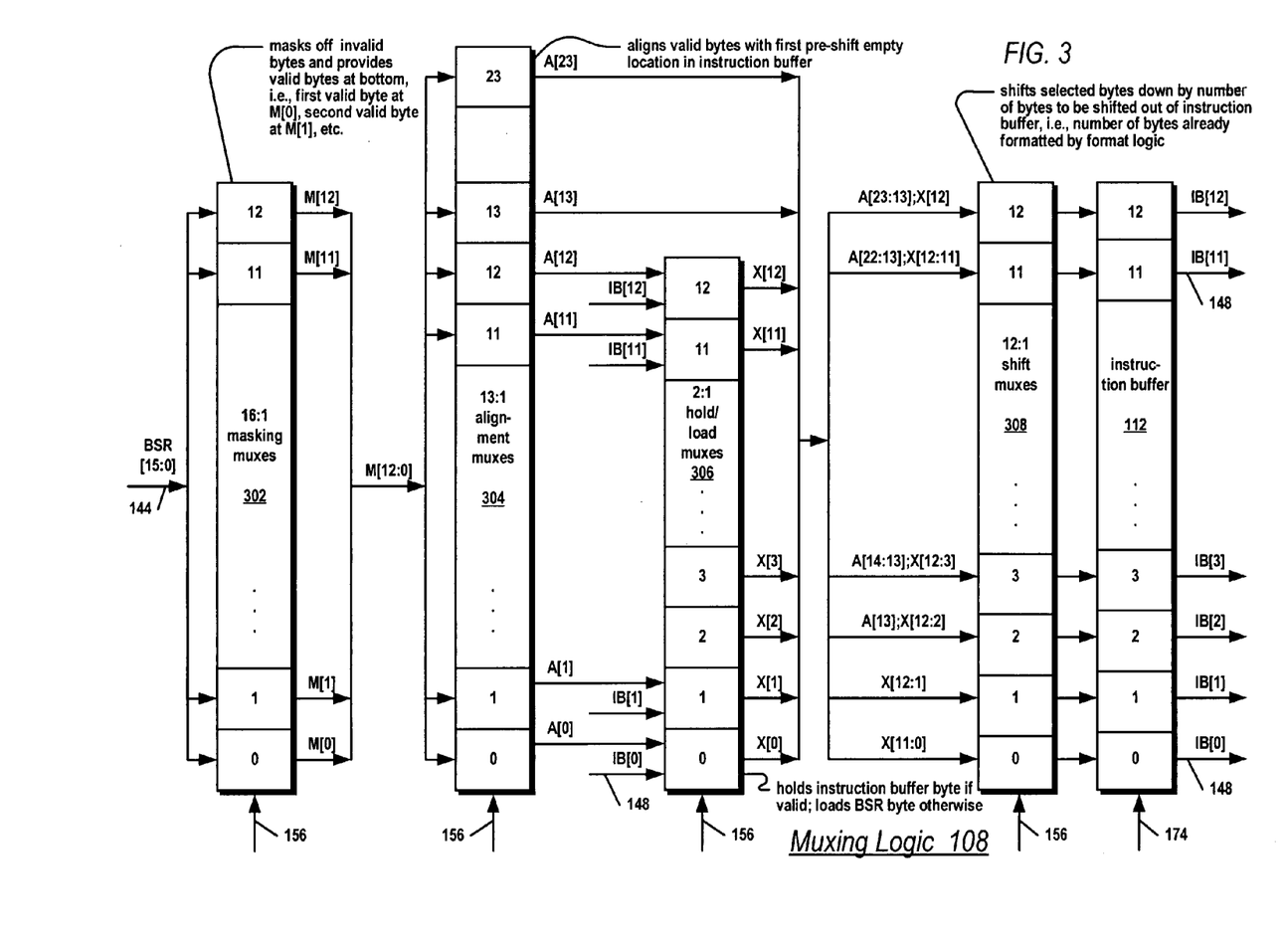
FIG. 3 is a block diagram of the muxing logic of FIG. 1 according to the present invention.

Referring now to FIG. 3, a block diagram of the muxing logic 108 of FIG. 1 according to the present invention is shown. The muxing logic 108 comprises a set of thirteen 16:1 masking muxes 302, each of which receives BSR[15:0], the 16 bytes from the byte selection register 104 of FIG. 1, via data bus 144. Each of the masking muxes 302 selects a byte. The bytes selected by the masking muxes 302 are provided on outputs M[12:0].

The masking muxes 302 are controlled by the control logic 122 via control signals 156 of FIG. 1. The masking muxes 302 operate in conjunction with one another to mask off, or discard, invalid instruction bytes stored in the byte selection register 104 (indicated by the valid bits 106) and to provide only valid instruction bytes at the bottom of the outputs M[12:0] of the masking muxes 302. That is, the first valid byte in the byte selection register 104 will be provided on output byte M[0], the second valid byte on output byte M[1], and so forth, such that if thirteen valid bytes are present in the byte selection register 104, then the thirteen valid bytes will be provided on output M[12]. Thus, for example, if byte 2 (i.e., BSR[2]) from the byte selection register 104 is the first valid byte, then it will be output on M[0]; if BSR[3] is valid, it will be output on M[1], and so forth.

The muxing logic 108 comprises a set of twenty-four 13:1 alignment muxes 304, each of which receives the 13 bytes M[12:0] from the masking muxes 302. Each of the alignment muxes 304 selects a byte. The selected bytes are provided on outputs A[23:0]. The alignment muxes 304 are controlled by the control logic 122 via control signals 156. The alignment muxes 304 operate in conjunction with one another to align the valid bytes received on M[12:0] from the masking muxes 302 with the first pre-shift location in the instruction buffer 112. That is, the alignment muxes 304 align the valid bytes received on M[12:0] with the instruction buffer 112 byte location that is empty prior to the instruction buffer 112 shifting out an already formatted instruction.

The upper alignment muxes 304 need not all be 13:1 muxes. In one embodiment, the alignment mux 304 for byte 23 is a 1:1 mux that only receives M[12] as an input, the alignment mux 304 for byte 22 is a 2:1 mux that only receives M[12:11] as inputs, the alignment mux 304 for byte 21 is a 3:1 mux that only receives M[12:10] as inputs, and so forth down to the alignment mux 304 for byte 12, which is a 12:1 mux that only receives M[12:1] as inputs.

In one embodiment, the masking muxes 302 and the alignment muxes 304 are combined into a single set of muxes that perform the combined functions of the embodiment of FIG. 3 described above.

The muxing logic 108 comprises a set of thirteen 2:1 hold/load muxes 306, each of which receives two input bytes. One input is the corresponding output A[n] of the alignment muxes 304. That is, the hold/load mux 306 for byte 0 receives as one input A[0] from the alignment mux 304 for byte 0, the hold/load mux 306 for byte 1 receives as one input A[1] from the alignment mux 304 for byte 1, and so forth to the hold/load mux 306 for byte 12, which receives as one input A[12] from the alignment mux 304 for byte 12. The second input to each of the hold/load muxes 306 is a corresponding one of outputs IB[12:0] of the instruction buffer 112 provided on data bus 148 of FIG. 1. That is, the hold/load mux 306 for byte 0 receives as the second input IB[0] from the instruction buffer 112 for byte 0, the hold/load mux 306 for byte 1 receives as the second input IB[1] from the instruction buffer 112 for byte 1, and so forth to the hold/load mux 306 for byte 12, which receives as the second input IB[12] from the instruction buffer 112 for byte 12.

The hold/load muxes 306 select one of the two inputs depending upon whether the corresponding byte in the instruction buffer 112 is valid. The control logic 122 controls the hold/load muxes 306 via control signals 156. Thus, for example, if byte 5 in the instruction buffer 112 is valid, then the corresponding hold/load mux 306 for byte 5 selects the IB[5] input to hold the value in the instruction buffer 112, rather than receiving an instruction byte from the byte selection register 104. Conversely, if byte 5 in the instruction buffer 112 is invalid (i.e., the location in the instruction buffer 112 for byte 5 is empty), then the corresponding hold/load mux 306 for byte 5 selects the A[5] input to receive an instruction byte from the byte selection register 104, rather than holding the IB[5] value. The hold/load muxes 306 provide the selected input on outputs X[12:0].

The muxing logic 108 comprises a set of thirteen 12:1 shift muxes 308, each of which receives 12 input bytes comprising different combinations of the outputs from the alignment muxes 304 (A[23:0]) and the hold/load muxes 306 (X[12:0]). The shift mux 308 for byte 0 receives X[11:0]; the shift mux 308 for byte 1 receives X[12:1]; the shift mux 308 for byte 2 receives A[13] and X[12:2]; the shift mux 308 for byte 3 receives A[14:13] and X[12:3]; and so forth up to the shift mux 308 for byte 11, which receives A[22:13] and X[12:11]; and the shift mux 308 for byte 12, which receives A[23:13] and X[12].

The shift muxes 308 shift down the bytes selected by the masking muxes 302, alignment muxes 304, and hold/load muxes 306 according to the number of instruction bytes that are to be shifted out of the instruction buffer 112. That is, when the instruction format logic 114 formats an instruction it reads from the instruction buffer 112 and determines the size in bytes of the formatted instruction, the size determines the number of bytes that will be shifted out of the instruction buffer 112. The size of the formatted instruction is the shift count 172 of FIG. 1, which is used by the control logic 122 to control the shift muxes 308 via control signals 156 to select the appropriate inputs to cause the shift.

The outputs of the shift muxes 308 are provided to a corresponding byte location in the instruction buffer 112 for loading of the masked, aligned, held/loaded and shifted instruction bytes. The loading of the instruction buffer 112 is controlled by the control logic 122 via control signals 174.

Thus, it may be observed that the muxing logic 108 of FIG. 3 advantageously densely packs only the valid instruction bytes from the byte selection register 104 into the instruction buffer 112, as will be described in more detail below with respect to the remaining Figures.

Figure 4:
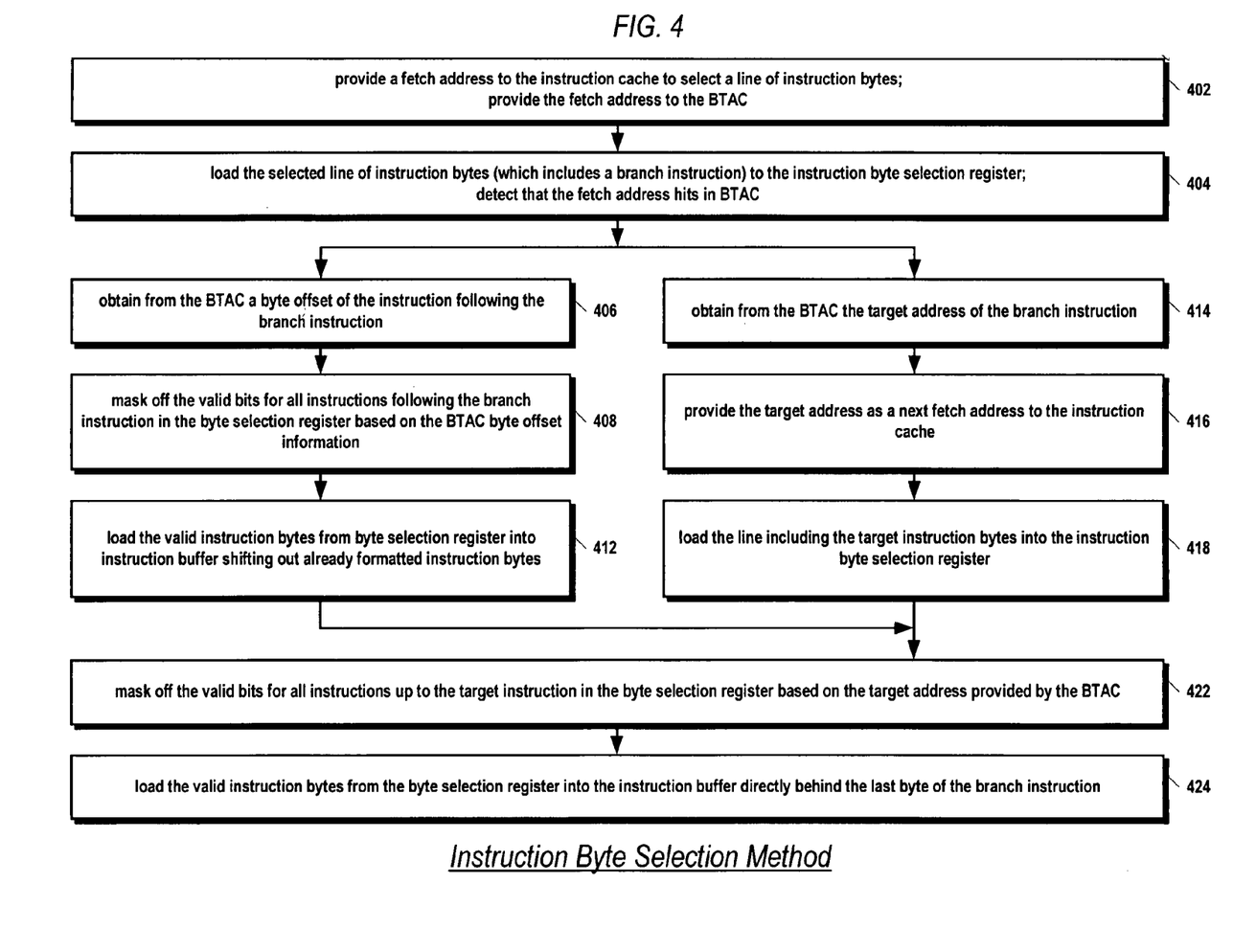
FIG. 4 is a flowchart illustrating operation of the branch control apparatus of FIG. 1 according to the present invention.

Referring now to FIG. 4, a flowchart illustrating operation of the branch control apparatus of FIG. 1 according to the present invention is shown. Flow begins at block 402.

At block 402, a fetch address 152 of FIG. 1 is provided to the instruction cache 102 of FIG. 1 to select a line of instruction bytes from the instruction cache 102. In addition, the fetch address 152 is provided to the BTAC 116 of FIG. 1, which generates a hit in the BTAC 116 if a target address for the fetch address 152 is stored in the BTAC 116. Flow proceeds from block 402 to block 404.

At block 404, the cache line of instruction bytes selected during step 402, which is assumed for purposes of illustration to include a branch instruction, is loaded into the byte selection register 104 of FIG. 1. In addition, the control logic 122 detects that the fetch address 152 hit in the BTAC 116 because the fetch address 152 of the cache line containing the branch instruction is cached in the BTAC 116. Flow proceeds from block 404 to blocks 406 and 414. Blocks 406 and 414 begin two respective flows of operation that are performed substantially concurrently. The first flow, comprising blocks 406, 408, and 412, will be described first.

At block 406, the control logic 122 obtains the BEG value 138 from the BTAC 116, which specifies the byte offset of the instruction following the branch instruction in the cache line selected during step 402. The BEG value 138 is correspondingly the offset of the instruction following the branch instruction in the byte selection register 104, because the byte selection register 104 is the same size as a cache line, and the cache line containing the branch instruction was loaded into the byte selection register 104 during step 404. For example, if a branch instruction begins at byte 3 and is 2 bytes long, then the BEG value 138 provided by the BTAC 116 will be 5, since the instruction following the branch instruction will begin at byte 5 in the byte selection register 104. Flow proceeds from block 406 to block 408.

At block 408, the control logic 122 masks off the valid bits for all instruction bytes in the byte selection register 104 following the branch instruction based on the BEG value 138 obtained from the BTAC 116 during step 406. Consequently, all instruction bytes in the byte selection register 104 marked invalid will be subsequently discarded and not provided to the instruction buffer 112 of FIG. 1. For example, if the BEG value 138 is 5, then bytes 5 through 15 in the byte selection register 104 will be marked invalid. Flow proceeds from block 408 to block 412.

At block 412, the instruction bytes in the byte selection register 104 that were marked valid during step 408 are loaded into the instruction buffer 112 by the control logic 122. Stated alternatively, the instruction bytes in the byte selection register 104 that were marked invalid during step 408 are not loaded into the instruction buffer 112. If instruction bytes are in the instruction buffer 112 which have already been formatted, then the formatted instruction bytes are shifted out of the instruction buffer 112 prior to the loading of the valid instruction bytes from the byte selection register 104. The number of valid bytes that are loaded from the byte selection register 104 into the instruction buffer 112 is limited by the amount of empty byte locations in the instruction buffer 112 after the formatted instructions are shifted out.

As described above with respect to FIG. 3, the valid bytes from the byte selection register 104 are loaded into the instruction buffer 112 directly behind the last valid non-formatted instruction byte in the instruction buffer 112. For example, if 15 bytes in the byte selection register 104 are valid, and 9 bytes are empty in the instruction buffer 112 after the formatted bytes are shifted out, only the first 9 valid bytes from the byte selection register 104 will be loaded into the instruction buffer 112.

The second concurrent flow, comprising blocks 414, 416, and 418, will now be described.

At block 414, the target address 132 of the branch instruction is obtained from the BTAC 116 and provided to mux 118 of FIG. 1. The target address 132 is obtained from the BTAC 116 substantially in parallel with the obtaining of the BEG value 138 from the BTAC 116 during step 406. Flow proceeds from block 414 to block 416.

At block 416, mux 118 selects the target address 132 provided by the BTAC 116 as the next fetch address 152 to the instruction cache 102. The selection of the target address 132 will cause the microprocessor 100 to speculatively branch to the cached target address 132 of the branch instruction contained in the cache line selected during step 402. That is, the target address 132 will be used as the next fetch address 152 to select a cache line containing the branch target instructions from the instruction cache 102. Flow proceeds from block 416 to block 418.

At block 418, a cache line of instruction bytes including the target instructions of the branch instruction is loaded into the byte selection register 104. The loading of the cache line containing the target instruction bytes into the byte selection register 104 during step 418 is performed substantially concurrently with the loading of the valid bytes including the branch instruction from the byte selection register 104 into the instruction buffer 112 during step 412. Flow merges from blocks 412 and 418 and proceeds from blocks 412 and 418 to block 422.

At block 422, the control logic 122 masks off the valid bits for all instruction bytes in the byte selection register 104 preceding the target instructions based on the target address 132 obtained from the BTAC 116 during step 414. Consequently, all instruction bytes in the byte selection register 104 marked invalid will be subsequently discarded and not provided to the instruction buffer 112. For example, if the least significant bits of the target address 132 are 0x7, then bytes 0 through 6 in the byte selection register 104 will be marked invalid. Flow proceeds from block 422 to block 424.

At block 424, the valid instruction bytes from the byte selection register 104, which now contains the target instructions, is loaded from the byte selection register 104 to the instruction buffer 112 directly behind the last byte of the branch instruction. An example of the operation of the branch control apparatus described above will be described now with respect to FIG. 5.

Figure 5:
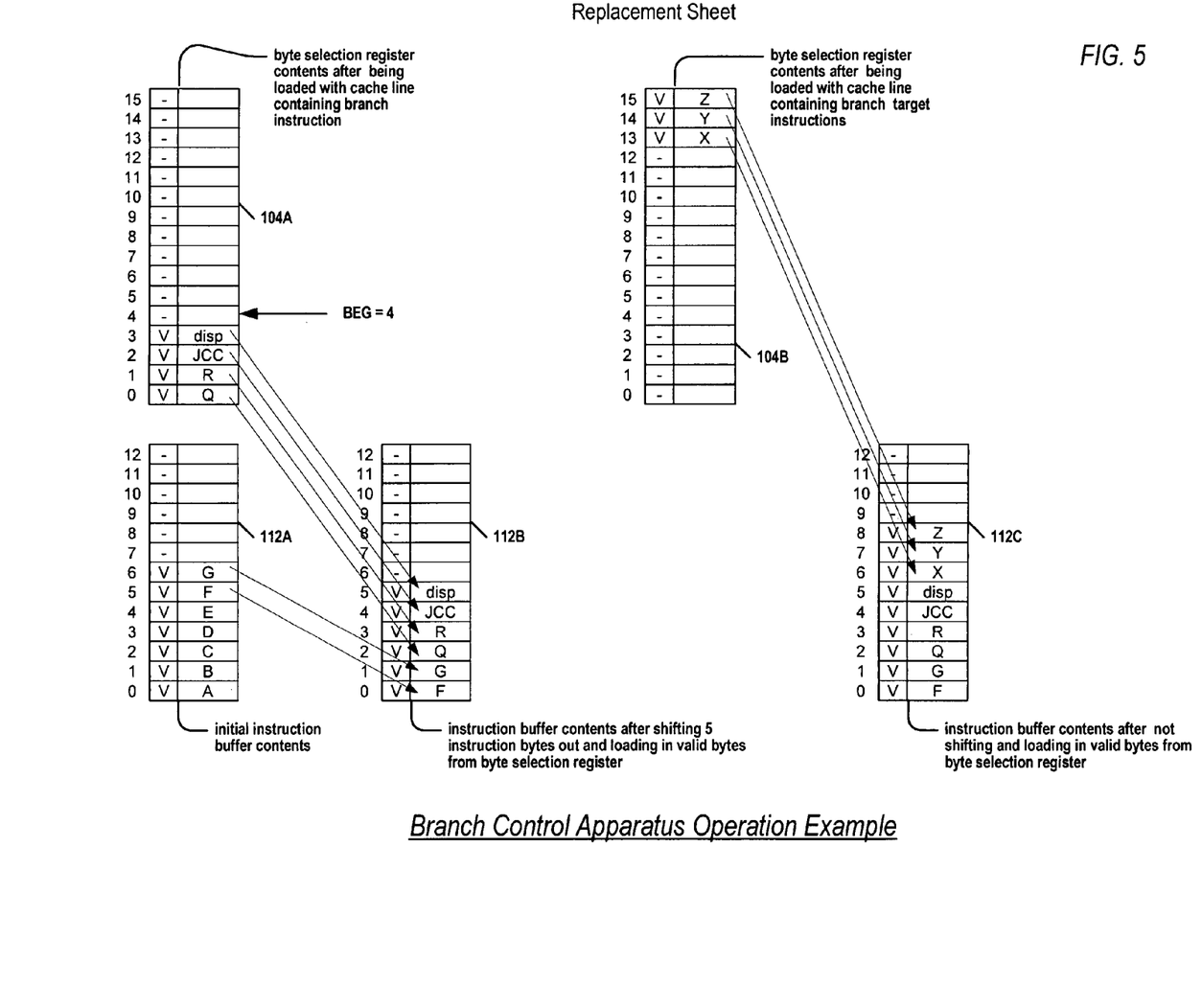
FIG. 5 is a block diagram illustrating an example of the operation of the branch control apparatus of FIG. 1 according to the present invention.

Referring now to FIG. 5, a block diagram illustrating an example of the operation of the branch control apparatus of FIG. 1 according to the present invention is shown. FIG. 5 shows the content of the byte selection register 104 at two different stages in the flow of FIG. 4, denoted 104A and 104B. FIG. 5 shows the content of the instruction buffer 112 at three different stages in the flow of FIG. 4, denoted 112A, 112B, and 112C.

Instruction buffer 112A shows the initial content of the instruction buffer 112 in the example. The instruction buffer 112A contains seven valid instruction bytes and six empty, or invalid, instruction byte locations. Hence, byte locations 0 through 6 of the instruction buffer 112A each contain an instruction byte, denoted A through G, respectively, for the example.

Byte selection register 104A shows the content of the byte selection register 104 after being loaded with the cache line containing the branch instruction during step 404 of FIG. 4 and after having the valid bits masked off during step 408 of FIG. 4 based on the offset information received from the BTAC 116 during step 406.

In byte selection register 104A, byte 0 contains an instruction byte denoted Q. Byte 1 contains an instruction byte denoted R. Byte 2 contains the first byte of a two-byte branch instruction, denoted "JCC", which is the opcode byte of an x86 conditional jump instruction. Byte 3 contains the second byte of the JCC instruction, which is a signed displacement, denoted "disp".

In the example, the BEG value 138 obtained by the control logic 122 from the BTAC 116 during step 406 of FIG. 4 is equal to 4, since the byte offset of the instruction following the branch instruction is 4. Consequently, during step 408 of FIG. 4, the control logic 122 marks bytes 0 through 3 valid and bytes 4 through 15 invalid.

Instruction buffer 112B shows the content of the instruction buffer 112 after shifting out five formatted instruction bytes in the example (i.e., instruction bytes A through E) and loading in the four valid instruction bytes (i.e., Q, R, JCC, and disp) from byte selection register 104A. That is, instruction buffer 112B shows the content after execution of step 412 of FIG. 4. The invalid instruction bytes that occupy bytes 4 through 15 of byte selection register 104A following the branch instruction are discarded by the masking muxes 302 of FIG. 3 and not loaded into the instruction buffer 112.

Byte 0 of instruction buffer 112B contains instruction byte F, shifted down from byte 5 of instruction buffer 112A. Similarly, byte 1 of instruction buffer 112B contains instruction byte G, shifted down from byte 6 of instruction buffer 112A. That is, bytes 0 and 1 of instruction buffer 112B are held by the hold/load muxes 306 of FIG. 3.

Byte 2 of instruction buffer 112B contains instruction byte Q, passing from byte 0 of the byte selection register 104A through the muxing logic 108 and loaded into byte 2 of instruction buffer 112B according to step 412 of FIG. 4 immediately adjacent to the highest valid byte in the post-shift instruction buffer 112B. Similarly, byte 3 of instruction buffer 112B contains instruction byte R, passing from byte 1 of the byte selection register 104A through the muxing logic 108 and loaded into byte 3 of instruction buffer 112B. Similarly, byte 4 of instruction buffer 112B contains the JCC opcode instruction byte, passing from byte 2 of the byte selection register 104A through the muxing logic 108 and loaded into byte 4 of instruction buffer 112B. Similarly, byte 5 of instruction buffer 112B contains the displacement byte of the JCC instruction, passing from byte 3 of the byte selection register 104A through the muxing logic 108 and loaded into byte 5 of instruction buffer 112B.

Byte selection register 104B shows the content of the byte selection register 104 after being loaded with the cache line containing the branch target instructions during step 418 of FIG. 4. In the example, the branch target instructions are denoted X, Y, and Z, which are located in bytes 13 through 15 of byte selection register 104B. Bytes X, Y, and Z may compose one, two, or three instructions, depending upon their instruction length. Because the first byte of the target instructions is located in byte 13 of the byte selection register 104B in the example, the control logic 122 has marked bytes 0 through 12 invalid by clearing the associated valid bits 106. Hence, bytes 0 through 12 of the byte selection register 104B will be discarded by the masking muxes 302 and not provided to the instruction buffer 112.

Instruction buffer 112C shows the content of the instruction buffer 112 after not shifting out any formatted instruction bytes and loading in the three valid instruction bytes of the target instructions (i.e., X, Y, and Z) from byte selection register 104B. That is, instruction buffer 112C shows the content after execution of step 424 of FIG. 4. The invalid instruction bytes that occupy bytes 0 through 12 of byte selection register 104B before the target instructions are discarded by the masking muxes 302 and not provided to the instruction buffer 112.

Bytes 0 through 5 of instruction buffer 112C contain the same values as bytes 0 through 5 of instruction buffer 112B, since no shift out occurred because the instruction format logic 114 of FIG. 1 was not able to format an instruction during the previous clock cycle. An example of a reason the instruction format logic 114 could not format an instruction is a stall in the microprocessor 100 pipeline (for example caused by execution of a floating point instruction, prior to the branch instruction, that requires many clock cycles to complete).

Byte 6 of instruction buffer 112C contains instruction byte X, passing from byte 13 of the byte selection register 104B through the muxing logic 108 and loaded into byte 6 of instruction buffer 112C according to step 424. Instruction byte X is loaded into the instruction buffer 112C immediately adjacent to the last byte of the branch instruction, i.e., adjacent to the disp byte, in instruction buffer 112C. Similarly, byte 7 of instruction buffer 112C contains instruction byte Y, passing from byte 14 of the byte selection register 104B through the muxing logic 108 and loaded into byte 7 of instruction buffer 112C according to step 424. Similarly, byte 8 of instruction buffer 112C contains instruction byte Z, passing from byte 15 of the byte selection register 104B through the muxing logic 108 and loaded into byte 8 of instruction buffer 112C according to step 424.

It is noted that a branch instruction may span, or wrap, over two different instruction cache 102 lines. In one embodiment, the BTAC 116 asserts the HIT signal 134 in conjunction with the fetch address 152 of the first cache line, i.e., with the cache line containing the first part of the branch instruction. In an alternate embodiment, the BTAC asserts the HIT signal 134 in conjunction with the fetch address 152 of the second cache line, i.e., with the cache line containing the second part of the branch instruction. That is, the BTAC 116 caches the fetch address 152 of the second portion of the branch instruction, rather than the first portion.

As may be seen from the foregoing example, the branch control apparatus of FIG. 1 operates to densely pack only valid instruction bytes into the byte-wide instruction buffer 112, shifting out already formatted instruction bytes, and storing non-formatted instruction bytes at the bottom of the instruction buffer 112. The instruction buffer 112 is directly coupled to the instruction format logic 114, as shown in FIG. 2, such that the valid instruction bytes at the bottom of the instruction buffer 112 may be provided directly to the instruction format logic 114 without additional steering logic required. The direct provision of the instruction bytes from the instruction buffer 112 to the instruction format logic 114 advantageously increases the time available for instruction formatting over a scheme that requires steering logic between the instruction buffer 112 and the instruction format logic 114.

Advantageously, the branch control apparatus works with the byte-wide directly coupled instruction buffer to handle branches performed based on a branch prediction by a BTAC that predicts the branch before the branch instruction is decoded by instruction decode logic.

Although the present invention and its objects, features, and advantages have been described in detail, other embodiments are encompassed by the invention. For example, the instruction buffer may vary in size, being capable of storing more or less instruction bytes than the embodiment shown. Furthermore, the size of the byte selection register may vary, as may the instruction cache line size.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A branch control apparatus in a microprocessor, comprising:

an instruction cache, for outputting a line of instruction bytes selected by a fetch address, said fetch address being provided by a multiplexer said line of instruction bytes containinn a branch instruction;

an instruction buffer, coupled to said instruction cache, for buffering said line of instruction bytes;

a branch target address cache (BTAC), coupled to receive said fetch address, from the multiplexer for predicting a target address of said branch instruction, and for providing offset information relating to a location of said branch instruction within said line of instruction bytes; and selection logic, coupled to said BTAC, for causing a portion of said instruction bytes to not be provided to said instruction buffer, based on said offset information.

2. The apparatus of claim 1, wherein said offset information specifies a location of an instruction immediately following said branch instruction within said line of instruction bytes.

3. The apparatus of claim 2, wherein said portion of said instruction bytes not provided to said instruction buffer comprises instruction bytes immediately following said branch instruction within said line of instruction bytes as specified by said offset.

4. The apparatus of claim 1, wherein said selection logic comprises:
a register, coupled between said instruction cache and said instruction buffer, for storing said line of instruction bytes.

5. The apparatus of claim 4, wherein said selection logic further comprises:
a plurality of valid bits, coupled to said register, wherein each of said plurality of vaild bits is associated with one of said instruction bytes in said register, wherein each of said plurality of valid bits indicates whether its associated one of said instruction bytes in said register is valid for execution by the microprocessor based on said target address predicted by said BTAC.

6. The apparatus of claim 5, wherein said selection logic populates said plurality of valid bits based on said offset information received from said BTAC.

7. The apparatus of claim 6, wherein said selection logic causes each of said instruction bytes in said register having a corresponding valid bit that indicates said corresponding instruction byte is invalid to not be provided to said instruction buffer.

8. The apparatus of claim 7, wherein said BTAC provides a hit signal to said selection logic for indicating whether or not said fetch address hit in said BTAC.

9. The apparatus of claim 8, wherein said selection logic populates said plurality of valid bits based on said offset information received from said BTAC if said hit signal indicates said fetch address hit in said BTAC.

10. The apparatus of claim 5, wherein said selection logic comprises:
muxing logic, coupled between said instruction cache and said instruction buffer, for causing ones of said instruction bytes indicated as valid by said associated valid bit to be provided to said instruction buffer.

11. The apparatus of claim 10, wherein said muxing logic comprises a set of muxes for discarding ones of said instruction bytes indicated as invalid by said associated valid bit.

12. The apparatus of claim 10, wherein said muxing logic comprises a set of muxes for aligning ones of said instruction bytes indicated as valid by said associated valid bit with a first empty location in said instruction buffer.

13. The apparatus of claim 10, wherein said muxing logic comprises a set of muxes for shifting ones of said instruction bytes indicated as valid by said associated valid bit by a number of bytes shifted out of said instruction buffer.

14. The apparatus of claim 13, wherein said selection logic is configured to receive a shift count from instruction format logic for indicating a number of instruction bytes to be shifted out of said instruction buffer.

15. The apparatus of claim 14, wherein said muxing logic shifts said ones of said instruction bytes indicated as valid by said associated valid bit by said shift count.

16. The apparatus of claim 1, wherein said instruction buffer comprises a shift register.

17. The apparatus of claim 16, wherein said shift register is one byte-wide.

18. The apparatus of claim 1, wherein said instruction buffer is directly coupled to instruction format logic that formats said instruction bytes.

19. The apparatus of claim 18, wherein a bottom byte of said instruction buffer is provided directly to a portion of said instruction format logic configured to a first byte of an instruction for formatting.

20. The apparatus of claim 1, wherein said branch instruction comprises an x86 branch instruction.

21. The apparatus of claim 1, wherein said BTAC is configured to provide a target address of said branch instruction in response to said fetch address.

22. The apparatus of claim 21, wherein said target address is selectively provided to said instruction cache as a subsequent fetch address for selecting a second line of instruction bytes containing a target instruction of said branch instruction in said instruction cache.

23. The apparatus of claim 22, wherein said selection logic causes said target instruction to be provided to said instruction buffer adjacent to said branch instruction within said instruction buffer.

24. The apparatus of claim 23, wherein said selection logic causes instruction bytes preceding said target instruction in said second line to be discarded and not provided to said instruction buffer.

25. The apparatus of claim 1, wherein said instruction cache stores variable length instructions for execution by the microprocessor.

26. A pre-decode stage within a microprocessor, comprising:
an instruction buffer, for buffering instruction data for provision to instruction format logic;
selection logic, coupled to said instruction buffer, for receiving first instruction data selected by a fetch address from an instruction cache, said first instruction data including a branch instruction; and
a branch target address cache (BIAC), coupled to said selection logic, for providing a target address of said branch instruction as a next fetch address to said instruction cache;
wherein said selection logic is configured to receive second instruction data selected by said target address from said instruction cache, said second instruction data including a target instruction of said branch instruction; and
wherein said selection logic is configured to write said branch instruction and said target instruction immediately adjacent to one another into said instruction buffer.

27. The pre-decode stage of claim 26, wherein said BTAC is configured to provide said target address in response to said fetch address.

28. The pre-decode stage of claim 26, wherein said BTAC is configured to provide to said selection logic an indication of a location in said first instruction data that immediately follows said branch instruction.

29. The pre-decode stage of claim 28, wherein said selection logic writes said branch instruction and said target instruction immediately adjacent to one another based on said indication of said location.

30. The pre-decode stage of claim 29, wherein said selection logic is configured to receive said target address.

31. The pre-decode stage of claim 30, wherein said selection logic writes said branch instruction and said target instruction immediately adjacent to one another based on said target address and said indication of said location.

32. The pre-decode stage of claim 28, wherein said BTAC is configured to provide said indication in response to said fetch address.

33. The pre-decode stage of claim 26, wherein said instruction buffer comprises a shift register.

34. The pre-decode stage of claim 33, wherein said shift register is one byte-wide.

35. The pre-decode stage of claim 33, wherein said selection logic writes said branch instruction and said target instruction immediately adjacent to a last valid data byte in said instruction buffer.

36. The pre-decode stage of claim 33, wherein said selection logic writes said branch instruction and said target instruction to a next empty location in said instruction buffer.

37. The pre-decode stage of claim 33, wherein said instruction buffer is directly coupled to said instruction format logic.

38. A method for providing a branch instruction and a target instruction of the branch instruction to an instruction buffer, the method comprising:
receiving from an instruction cache a first cache line containing the branch instruction;
receiving from a branch target address cache (BTAC) an offset within said first cahe line of an instruction immediately following the branch instruction;
receiving from the instruction cache a second cache line containing the target instruction, said second cache line selected by a target address of the branch instruction provided by said BTAG;
discarding instructions after the branch instruction in said first cache line;
discarding instructions preceding the target instruction in said second cache line; and
providing to the instruction buffer a portion of said first and second cache lines remaining after each of said discardings.

39. The method of claim 38, wherein said discarding instructions after the branch instruction in said first cache line is performed based on said offset.

40. The method of claim 38, wherein said discarding instructions preceding the target instruction in said second cache line is performed based on said target address.

41. The method of claim 38, further comprising:
providing a fetch address to the instruction cache prior to said receiving from the instruction cache said first cache line;
wherein the instruction cache provides said first cache line in response to said fetch address.

42. The method of claim 41, further comprising:
providing said fetch address to the BTAC prior to said receiving from said BTAC said offset;
wherein said BTAC provides said offset in response to said fetch address.

43. The method of claim 38, further comprising:
storing said first cache line in a register prior to said discarding instructions after the branch instruction in said first cache line.

44. The method of claim 43, wherein said discarding instructions after the branch instruction in said first cache line comprises marking said instructions after the branch instruction in said register invalid, and not providing said instructions marked invalid in said register to the instruction buffer.

45. The method of claim 38, further comprising:
storing said second cache line in a register prior to said discarding instructions preceding the target instruction in said second cache line.

46. The method of claim 45, wherein said discarding instructions preceding the target instruction in said second cache line comprises marking said instructions preceding the target instruction in said register invalid, and not providing said instructions marked invalid to the instruction buffer.

47. The apparatus of claim 1, wherein said line of instruction bytes comprises a variable number of instructions.

48. The apparatus of claim 1, wherein said line of instruction bytes comprises instructions of variable length.

49. The pre-decode stage of claim 26, wherein said instruction data buffered in said instruction buffer comprises a variable number of instructions.

50. The pre-decode stage of claim 26, wherein said instruction data buffered in said instruction buffer comprises instructions of variable length.

51. The method of claim 38, wherein the first and second cache lines comprise a variable number of instructions.

52. The method of claim 38, wherein the first and second cache lines comprise instructions of variable length.

* * * * *

UNITED STATES PATENT AND TRADEMARK OFFICE
CERTIFICATE OF CORRECTION

PATENT NO. : 7,162,619 B2 Page 1 of 1
APPLICATION NO. : 09/898583
DATED : January 9, 2007
INVENTOR(S) : G. Glenn Henry and Thomas C. McDonald It is certified that error appears in the above-identified patent and that said Letters Patent is hereby corrected as shown below:

In claim 1, at column 15, line 4, replace "containinn" with -- containing --.

Signed and Sealed this

Sixth Day of March, 2007

JON W. DUDAS
*Director of the United States Patent and Trademark Office*